United States Patent
Virk

(10) Patent No.: US 8,006,644 B1
(45) Date of Patent: Aug. 30, 2011

(54) FISHBOWL CLEANING METHOD AND APPARATUS

(76) Inventor: Tasvir S. Virk, Roseville, CA (US)

( * ) Notice: Subject to any disclaimer, the term of this patent is extended or adjusted under 35 U.S.C. 154(b) by 189 days.

(21) Appl. No.: 12/077,595

(22) Filed: Mar. 17, 2008

(51) Int. Cl.
*A01K 63/02* (2006.01)

(52) U.S. Cl. .......... 119/201

(58) Field of Classification Search ......... 119/200, 119/201, 215, 216; 220/661, 676
See application file for complete search history.

(56) References Cited

U.S. PATENT DOCUMENTS

| | | | |
|---|---|---|---|
| 902,111 A * | 10/1908 | Robinson | 99/418 |
| 4,606,143 A * | 8/1986 | Murphy, Jr. | 43/56 |
| 5,289,953 A * | 3/1994 | McMillan et al. | 222/189.07 |
| 5,394,639 A | 3/1995 | Tentler | |
| 5,549,227 A | 8/1996 | Klotz | |
| 6,595,394 B1 * | 7/2003 | Savala | 222/189.07 |
| 7,017,297 B1 * | 3/2006 | Ward | 43/55 |
| 7,285,928 B1 * | 10/2007 | Jolly et al. | 318/280 |
| 2001/0045050 A1 * | 11/2001 | Sanquist | 43/55 |
| 2005/0086851 A1 | 4/2005 | Carden, Jr. | |
| 2006/0196442 A1 | 9/2006 | Holms | |
| 2007/0062098 A1 | 3/2007 | Gentry | |

OTHER PUBLICATIONS

Fish Bowls; Jun. 19, 2000; http://www.aquariumfish.net/information/fish_bowls.htm; retrieved from internet: Dec. 17, 2009.*
Saltwater, Marine aquarium basic setup; Dec. 15, 2005; http://reviews.ebay.com/Saltwater-Marine-aquarium-basic-setup_W0QQugidZ10000000000104877; retrieved from internet: Dec. 17, 2009.*

* cited by examiner

*Primary Examiner* — Kimberly S Smith
*Assistant Examiner* — Kristen C Hayes
(74) *Attorney, Agent, or Firm* — Heisler & Associates

(57) ABSTRACT

A pitcher is provided as a preferred form of apparatus for use in a fishbowl cleaning procedure. The pitcher has a side wall extending from a floor to a rim. Holes are formed in the side wall spaced above a floor and below the rim. Water and fish can be poured from a fishbowl into the pitcher. The fish and residual water remain within the pitcher below lowermost holes in the side wall. Excess water drains through the holes in the side wall. The fishbowl can then be cleaned or otherwise reconfigured. Finally, the pitcher can be tilted to pour the residual water and the fish from the pitcher back into the fishbowl.

7 Claims, 3 Drawing Sheets

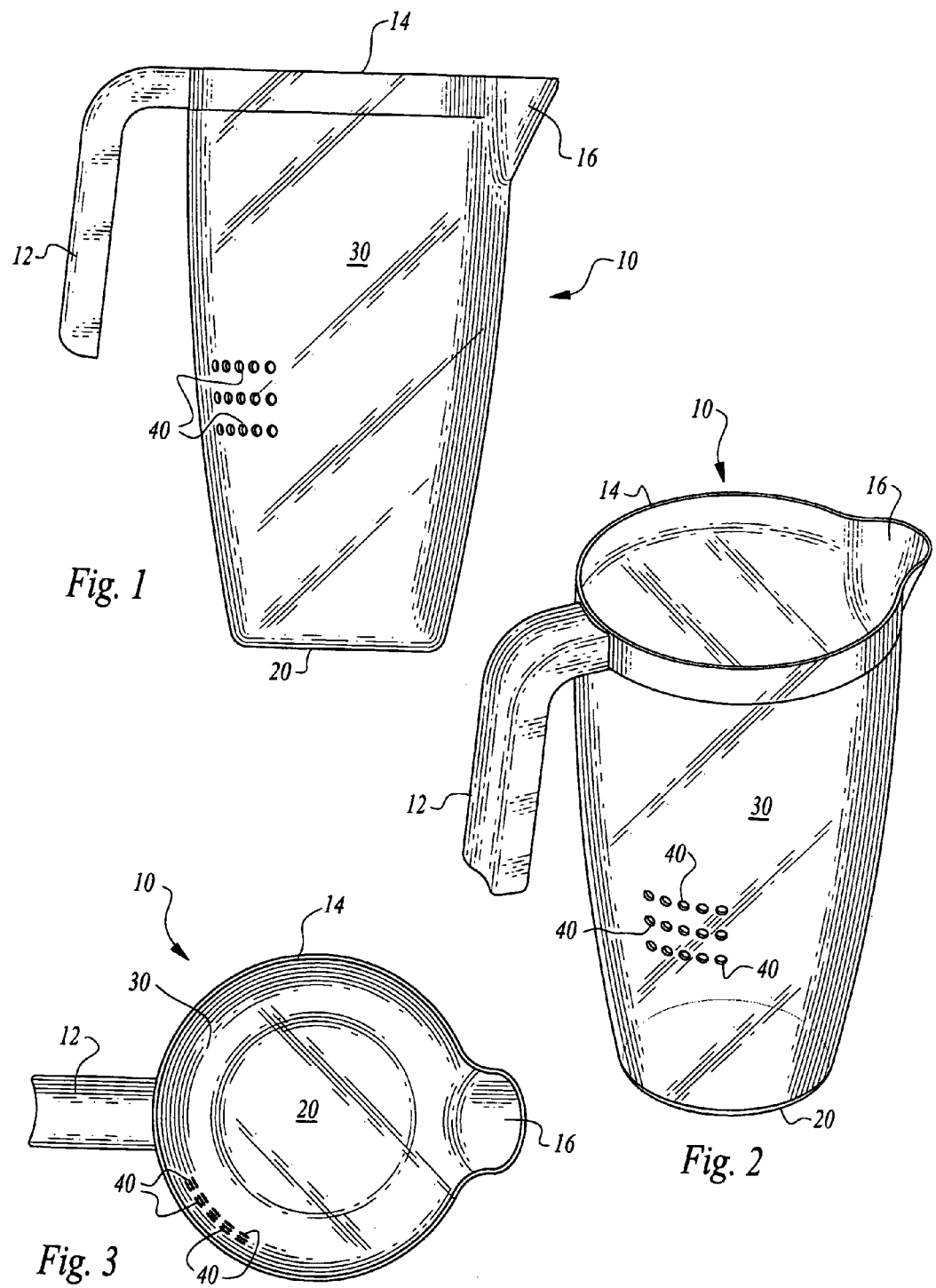

FISHBOWL CLEANING METHOD AND APPARATUS

FIELD OF THE INVENTION

The following invention relates to containers for transfer of fish and water from a fishbowl or aquarium, such as for washing. More particularly, this invention relates to a method for cleaning a fishbowl utilizing a container with strategically placed holes in a side wall thereof.

BACKGROUND OF THE INVENTION

Fishbowls and other aquariums require periodic cleaning. Such cleaning typically involves washing inside surfaces of the glass and potentially cleaning out gravel and other structures contained within the fishbowl. Such cleaning is typically most effective when the fish are first removed from the fishbowl.

Removing fish from the fishbowl can be accomplished following a variety of different methods. Perhaps the most common method is to utilize a net to catch the fish. When such a net is utilized, the fish encounters both mental and physical stress. Physical stress is associated with the amount of time that the fish is "out of water" when the net is lifted out of the water. Also, portions of the net coming into contact with the fish can damage protective films that collect on the scales of the fish or otherwise do damage to the scales or other portions of the fish by coming in direct contact with the fish.

Such removal of the fish also is believed to cause the fish to encounter significant psychological stress. First the fish endure a chase experience where the fish are attempting to avoid being caught by the net. Second, the fish undergo the experience of having been caught in the net and being unable to free themselves. Third, the fish undergoes the stress associated with being removed from the water. Fourth, the fish is put in a container that usually is different from the water in the fishbowl.

The physical and mental stress the fish encounter can cause the fish to be more susceptible to disease or premature death. Furthermore, many individuals desire to minimize physical and emotional stress to the fish in recognition of the animal's right to be free from unnecessary harm. Accordingly, a need exists for a better way to remove fish from a fishbowl than utilizing a net.

If a pitcher or other container is used and the contents of the fishbowl or other aquarium are merely poured into this separate container, further difficulties are encountered. If the container is too small, the container must be repeatedly emptied until the filling procedure also results in the fish going from the fishbowl into the container. If the container is too large, the fish can be transitioned into the container fairly easily but then the problem occurs when the fish must be captured for return back into the fishbowl. Hence, merely pouring all of the contents of the fishbowl into a separate container is generally not completely effective.

Some water changing apparatuses are built into the fishbowl or aquarium. For instance, U.S. Published Patent Application No. 2006/0196442 to Holms teaches a dual-purpose cap and jar-aquarium with a series of small apertures in the cap to allow aquarium water to be changed. However, Holms requires either purchasing of an aquarium of this type or specially modifying an aquarium for this purpose, rather than having the freedom to solve the problem for use with existing fishbowls and other aquariums. Also, Holms cannot completely empty the aquarium for cleaning.

Other inventions are known in the prior art for containing live fish and which include holes therein to allow water to pass into and out of such enclosures. For instance, bait containers for containing fish which are intended to be used as live bait are in the form of enclosures having holes therein. However, these enclosures are complete including an upper portion thereof, and so are not effective for pouring of contents of a fishbowl or aquarium into such enclosures.

SUMMARY OF THE INVENTION

With this invention an apparatus is provided in the form of a pitcher. Water from a fishbowl or aquarium can be poured into the pitcher and the pitcher has an open upper end surrounded by a rim to easily collect the water poured out of the fishbowl. The pitcher uniquely includes a plurality of holes in a side wall thereof. These holes allow water to pass out of the pitcher as the water is being poured into the pitcher. The pitcher also preferably includes a floor so that the pitcher can rest upon a substantially horizontal surface.

The holes are spaced above this floor by a minimum distance that defines a space which can readily hold the fish therein. For instance, lowest holes could be perhaps three inches above the floor. All of the water in the fishbowl can be poured into the pitcher and flow out of the holes in the side wall. The pitcher will ultimately contain any fish and just enough water between the lowermost holes and the floor for holding the fish while the fishbowl can be readily cleaned.

Once the fishbowl is cleaned and water has been added to the fishbowl, the fish and remaining water in the pitcher can be poured from the pitcher back into the fishbowl. The entire process can occur while the pitcher is within a separate basin or sink to collect the water that pours out of the holes in the side wall of the pitcher.

OBJECTS OF THE INVENTION

Accordingly, a primary object of the present invention is to provide a method for easily and reliably removing fish from a fishbowl, such as for cleaning of the fishbowl or other aquarium.

Another object of the present invention is to provide a method for capturing a fish without traumatizing the fish or doing any physical damage to the fish.

Another object of the present invention is to provide a pitcher for receiving fish and water from an aquarium in a small amount, such as when the aquarium is to be cleaned.

Another object of the present invention is to provide a method for cleaning a fishbowl which is simple enough to be performed by young children.

Another object of the present invention is to provide an enclosure which is open on an upper end so that water from a fishbowl or other aquarium can be readily poured thereinto and which has holes in a side wall thereof to allow draining of water and leaving only fish and a small amount of water within the enclosure.

Another object of the present invention is to provide a pitcher for receiving fishbowl or aquarium water which can fit within a separate basin or sink so that a minimum of spilled water occurs while transferring water out of the fishbowl.

Other further objects of the present invention will become apparent from a careful reading of the included drawing figures, the claims and detailed description of the invention.

BRIEF DESCRIPTION OF THE DRAWINGS

FIG. 1 is a front elevation view of the pitcher defining a preferred form of apparatus for use in the fishbowl cleaning method of this invention.

FIG. 2 is a perspective view of that which is shown in FIG. 1.

FIG. 3 is a top plan view of that which is shown in FIG. 1.

DESCRIPTION OF THE PREFERRED EMBODIMENT

Figure 7:
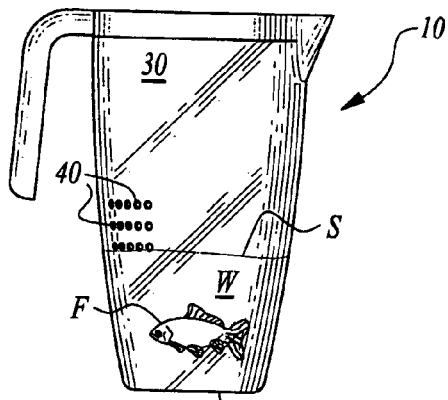
FIG. 7 is a front elevation view of the pitcher of this invention with fish and a small amount of water contained therein, following the process of emptying out contents of the fishbowl.
Figure 9:
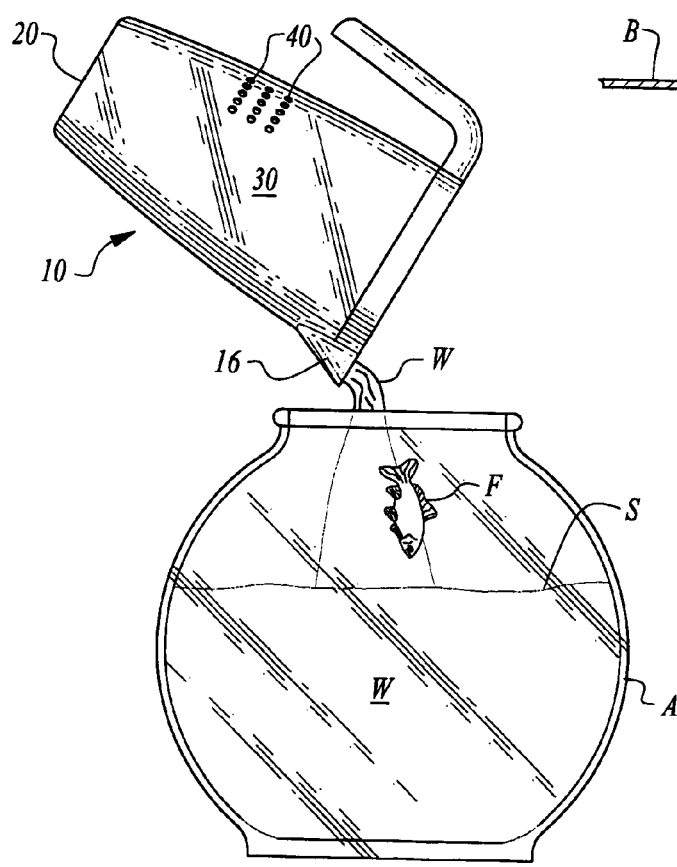
FIG. 9 is a front elevation view of the pitcher and fishbowl together and with the fishbowl receiving water and fish from the pitcher, which has been tilted to pour the water and fish back into the fishbowl.

Referring to the drawings, wherein like reference numerals represent like parts throughout the various drawing figures, reference numeral 10 is directed to a pitcher (FIGS. 1-3) providing a preferred form of enclosure apparatus for practicing the fishbowl cleaning method of this invention. The pitcher 10 can receive a fish F and a small amount of water W from a fishbowl A by having the contents of the fishbowl A poured into the pitcher 10. Excess water W pours out holes 40 in the pitcher 10, leaving only a small amount of water W and the fish F within the pitcher 10 (FIG. 7). The fishbowl A can then be thoroughly cleaned, partially filled with water and the remaining water W and fish F within the pitcher 10 can be poured back into the fishbowl A (FIG. 9).

In essence, and with particular reference to FIGS. 1-3, basic details of the pitcher 10 are described. The pitcher 10 forms a substantially complete enclosure on all sides except for an upper end thereof. The pitcher 10 thus includes a floor 20 with a side wall 30 extending up from the floor 20 to a rim 14. A handle 12 extends from the side wall 30 and a spout 16 is formed in the rim 14. Holes 40 are formed in the side wall 30. These holes are above the floor 20 and below the rim. When water W is poured into the pitcher 10 through the upper end thereof, water W and fish F collect within the pitcher 10 below the holes 40 and above the floor 20. Excess water W pours out the holes 40. Such excess water W can be captured within a basin B and drain D (FIG. 6) if desired.

More specifically, and with particular reference to FIGS. 1-3, specific details of the pitcher 10 are described. The pitcher 10 is preferably a monolithic structure formed from a homogeneous lightweight thin walled polymeric hydrocarbon material, most preferably some form of polyethylene or other injection moldable plastic material. Most preferably, this material is at least partially transparent so that contents within the pitcher 10 can be most easily seen. It is also conceivable, but less desirable that the pitcher 10 could be formed from other material. For instance, the pitcher 10 could be formed of glass, or formed of some form of metal or composite materials.

The pitcher 10 is preferably sufficiently rigid so that it maintains the same shape regardless of whether it is full or empty or whether it is upright or angled. The pitcher 10 has a generally cylindrical form with a circular floor 20 defining a lower end of the pitcher 10 and an upper end surrounded by a rim 14. This rim 14 surrounds an opening into which water W and fish F can be readily poured into the pitcher 10.

A handle 12 preferably extends from the pitcher 10 near the rim 14. This handle 12 preferably first extends substantially horizontally and then bends to extend substantially vertically downward. The handle 12 could alternatively join back to the side wall 30 of the pitcher 10, but most preferably remains open at a lower end thereof. Most preferably, the handle 12 is formed so that it can nest within other handles when the pitcher 10 is nested within other pitchers 10 of like form. The handle 12 also is preferably a thin walled structure having a thickness similar to that of the side wall 30.

A spout 16 preferably extends from the rim 14 on a side of the rim 14 opposite the handle 12. This spout 16 facilitates pouring of water and the fish F out of the pitcher 10 such as when returning the water W and fish F back into the fishbowl A (FIG. 9). The spout 16 is preferably at least twice as wide as it is deep and about three times taller than it is deep so that the spout is broad enough to keep the fish F from impacting sides of the spout 16 when being poured back into the fishbowl A. While the spout 16 and handle 12 are desirable, it is conceivable that a simplified form of pitcher 10 could be provided without the spout 16 or without the handle 12. In such a case, the user would merely grasp the side wall 30 of the pitcher 10 and let the rim 14 act as a form of spout 16.

The side wall 30 extends from the floor 20 up to the rim 14 and is preferably substantially cylindrical in form, with a slight taper so that the rim 14 is greater in diameter than the floor 20, allowing pitchers 10 of like size and shape to be rested together. This side wall 30 is preferably 1/32 of an inch thick and has just enough rigidity so that it maintains its form whether full or empty. In this way, a weight of the pitcher 10 can be minimized to make it as easy to handle as possible. In one embodiment the rim 14 can have a diameter of four and a half inches while the floor 20 can have a diameter of three inches. Most preferably, the floor 20 is entirely flat so that the pitcher 10 is stable when resting upon a substantially horizontal surface. If desired, the floor 20 could be formed with a larger diameter to further enhance stability of the pitcher 10 when resting upon a horizontal surface. Furthermore, all of the dimensions of the pitcher 10 could be scaled up or down to change an overall size of the pitcher 10 or to change proportions of the various different components of the pitcher 10.

Figures 4, 5, 6:
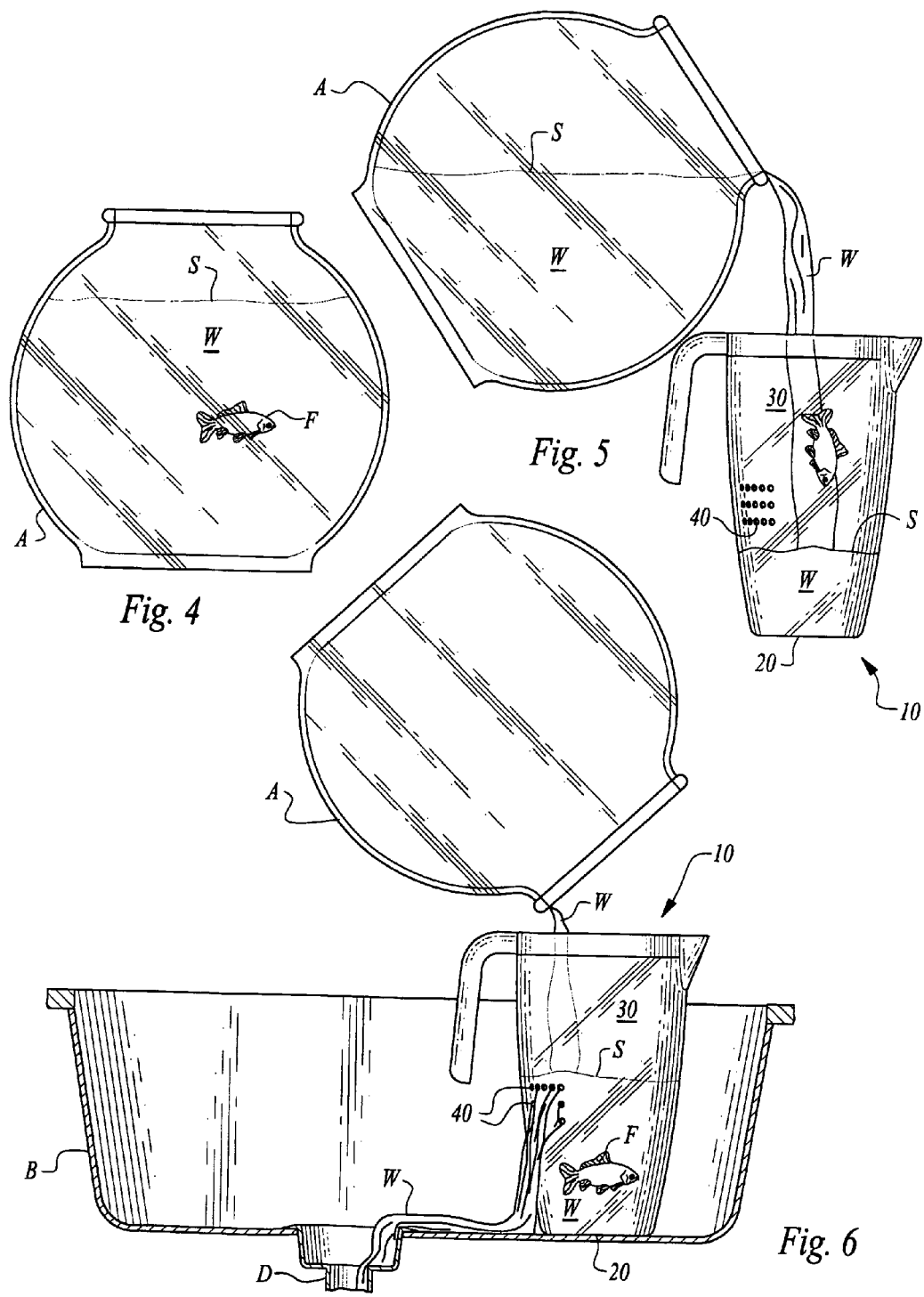
FIG. 4 is a front elevation view of a fishbowl before removal of a fish and water therefrom.
FIG. 5 is a front elevation view of the pitcher of this invention and the aquarium with the aquarium tilted and with water pouring into the pitcher.
FIG. 6 is a front elevation view of the pitcher of this invention within a basin and with the fishbowl completing the process of pouring water out of the fishbowl, through the pitcher and into a drain of the basin.

With continuing reference to FIGS. 1-3, particular details of the holes 40 are described. The holes 40 pass through the side wall 30 and provide a path for water W to escape out of the pitcher 10. In particular, the fishbowl A contains more water W than is needed to keep the fish F safe and healthy during the short period of time that the fishbowl A is being cleaned. As water W and the fish F are poured into the pitcher 10, excess water W passes through the holes 40 and can then be collected within a basin B to pass down a drain D (FIG. 6).

In the preferred embodiment, the holes 40 are 5/32 of an inch in diameter. However, holes slightly larger or smaller can also be effective. Most preferably, the holes 40 are no larger than 1/4 of an inch. The holes are preferably provided in a three by five array of fifteen holes with five holes in a lowermost horizontal row, five holes in a middle row and five holes in an upper row. The holes 40 in the lowermost row define a height for the surface S of the water W within the pitcher 10 containing the fish F. The holes 40 in the middle and upper rows remove excess water W more efficiently during the initial pouring process when a large rate of inflow of water W into the pitcher 10 might be experienced, to help prevent overflow of the pitcher 10.

Holes of 5/32 of an inch diameter have been found by experiment and study of appropriate literature on fish to be sized appropriately to both efficiently remove water W from the pitcher 10 and also be small enough to preclude nearly all species of fish commonly sold via retail fish stores from passing therethrough once the fish are mature. Typically, fish continue to grow throughout their life. Fish are defined as mature once they are past an egg stage and past a fry stage when they might otherwise be exceedingly small.

The holes 40 could alternatively take on a variety of different configurations. For instance, the holes could be staggered or provided in various different patterns, even conceivably patterns that spell words or provide other attractive symbols. The holes might even be provided in a pattern which spells a trademark for the pitcher 10 product.

The holes 40 could be in some shape other than circular, with circular holes merely being easy to form by a drill. The term holes 40 is broadly meant to include not only holes that might be drilled through the side wall 30, but also to include fenestrations within a screen structure or any other openings in the side wall 30 through which water W can pass. For instance, in one embodiment a large hole might be provided and then covered with a screen structure with fenestrations in the screen small enough to preclude fish from passing therethrough. Such fenestrations would be considered to be holes within the meaning of this invention.

Most preferably, the holes 40 are grouped together in a specific region on the side wall 30 that places the holes closer to the handle 12 than to the spout 16. In particular, the holes 40 are preferably not directly beneath the handle 12, but slightly to the side of the handle 12 but still closer to the handle 12 than to the spout 16. The preferred position for the holes 40 is perhaps best illustrated in FIG. 3.

In use and operation, and with particular reference to FIGS. 4-9, the steps in the method utilizing the pitcher 10 of this invention, such as for cleaning the fishbowl A, are illustrated. Initially, the fish F is contained within the fishbowl A, swimming within water W below a surface S of the water W within the fishbowl A. This fishbowl A could be generally spherical as shown or could have any of a variety of different shapes common for fishbowls or aquariums. While this invention is most suitable for fishbowls A or other aquariums that are small enough to be easily picked up and tilted for pouring water W out of the fishbowl A, this method could also be utilized for larger fish containing tanks, aquariums or other fish enclosures.

The pitcher 10 is then placed upon a horizontal surface. Most preferably, this surface is within a basin B, such as a sink (FIG. 6). The fishbowl A is then brought near the pitcher 10 and tilted so that water W pours out of the fishbowl A and into the pitcher 10 (FIG. 5). As this process continues, the fish F will ultimately fall with the water W out of the fishbowl A and into the pitcher 10.

Once sufficient water W has poured into the pitcher 10 to reach the holes 40, the water W pours through the holes 40 and down the drain D (FIG. 6). The fish F remains with a small amount of water W beneath a surface S within the pitcher 10 (FIG. 6).

Once all of the water W has been poured from the fishbowl A, the fish F remains within the water W at a lower portion of the pitcher 10 (FIG. 7). The fishbowl A can then be thoroughly cleaned or otherwise modified without interfering with the fish F. Once the fishbowl A has been thoroughly cleaned or otherwise prepared, the fish F is ready to be returned to the fishbowl A.

Figure 8:
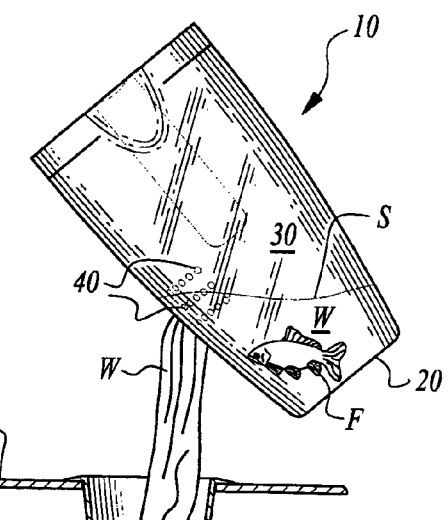
FIG. 8 is a side elevation view of that which is shown in FIG. 6 and with the pitcher tilted to the side to further reduce an amount of water within the pitcher.

If it is desired to minimize return of residual water A along with the fish F back into the aquarium A, the pitcher 10 can be finally tilted somewhat at an angle toward the holes 40 so that some of the residual water W remaining within the pitcher 10 can be removed (FIG. 8). This tilting technique can also be followed to minimize the possibility of spilling water W out of the holes 40 before the user is ready to pour the water W back into the fishbowl A.

Finally, the pitcher 10 can be tilted in an opposite direction towards the spout 16 and the remaining residual water W and fish F can be poured back into the fishbowl A (FIG. 9). Because the holes 40 are preferably slightly closer to the handle 12 than to the spout 16, the process of removing a portion of the residual water W is facilitated when the pitcher 10 is tilted laterally. Then, when the pitcher 10 is tilted in a manner aligned with the spout 16 for return of residual water. W and fish F back into the fishbowl A, no water W passes through the holes 40. Note that the fish F remains within the water W during the entire transfer process. As a result, physical and mental harm to the fish F is kept at an absolute minimum.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A method for safely removing a fish from an aquarium, such as for cleaning the aquarium, the method including the steps of:
   providing an apparatus including an enclosure; the enclosure having an open upper end and a closed lower end; the enclosure having a side wall extending from the upper end to the lower end; and a plurality of holes in the side wall, each of the holes spaced above the lower end and below the upper end;
   pouring the water and fish from the aquarium into the upper end of the apparatus; and
   allowing water to drain out of the apparatus through the holes with water and the fish remaining below the holes and above the lower end of the enclosure.

2. The method of claim 1 wherein said pouring step is preceded by the step of placing the apparatus in a water collection basin.

3. The method of claim 1 including the further step of tilting the apparatus to further pour water through the holes and reduce water remaining within the apparatus.

4. The method of claim 1 including the further step of pouring remaining water and the fish from the apparatus back into the aquarium.

5. The method of claim 1 including the further step of configuring the apparatus of said providing step to include the closed lower end having a smaller size than the open upper end, sufficient to facilitate nesting of like apparatuses at least partially inside one another with the closed lower end fitting within the open upper end.

6. The method of claim 1 wherein said allowing step includes the step of keeping the apparatus upright with the open upper end above the closed lower end, and with water draining out of the apparatus through the holes in the side wall.

7. The method of claim 1 wherein said providing step includes providing the plurality of holes with at least one lowermost hole, the lowermost hole located closer to the lower end than to the upper end, the lowermost hole unobstructed laterally on an exterior side of the side wall to allow water to flow through the lowermost hole laterally and then down away from the enclosure.

* * * * *